(12) United States Patent
Bin Norazmi et al.

(10) Patent No.: US 11,910,789 B2
(45) Date of Patent: Feb. 27, 2024

(54) LINE GUIDE APPARATUS OF FISHING REEL

(71) Applicant: Shimano Components (Malaysia) SDN. BHD., Johor (MY)

(72) Inventors: Muhammad Aliff Nazreen Bin Norazmi, Johor (MY); Baihaki Bin Sabtu, Johor (MY); Hirokazu Hiraoka, Sakai (JP); Mohd Syamsul Johary Bin Ismail, Johor (MY); Muhd Syukri Nazry Bin Mustapha, Johor (MY); Abu Supian Bin Ahmad, Johor (MY)

(73) Assignee: SHIMANO COMPONENTS (MALAYSIA) SDN. BHD., Johor (MY)

( * ) Notice: Subject to any disclaimer, the term of this patent is extended or adjusted under 35 U.S.C. 154(b) by 298 days.

(21) Appl. No.: 17/412,470

(22) Filed: Aug. 26, 2021

(65) Prior Publication Data

US 2022/0061282 A1 Mar. 3, 2022

(51) Int. Cl.
*A01K 89/01* (2006.01)
*A01K 89/00* (2006.01)

(52) U.S. Cl.
CPC ................ *A01K 89/003* (2013.01)

(58) Field of Classification Search
CPC ...... A01K 89/01082; A01K 89/019125; A01K 89/01918; A01K 89/01919
See application file for complete search history.

(56) References Cited

U.S. PATENT DOCUMENTS

| | | | | | |
|---|---|---|---|---|---|
| 4,080,748 | A | * | 3/1978 | Ohmura | A01K 87/04 43/24 |
| 4,196,537 | A | * | 4/1980 | Ohmura | A01K 87/04 43/24 |
| 4,625,450 | A | * | 12/1986 | Roemer, Jr. | A01K 91/06 43/43.12 |
| 5,311,695 | A | * | 5/1994 | Yasui | A01K 87/04 43/24 |
| 5,669,566 | A | * | 9/1997 | Puryear | A01K 89/0102 242/234 |
| 6,915,974 | B2 | | 7/2005 | Kawasaki | |
| 9,615,559 | B2 | | 4/2017 | Hyun | |
| 2016/0143259 | A1 | * | 5/2016 | Hyun | A01K 89/01912 242/273 |
| 2019/0191681 | A1 | * | 6/2019 | Ochiai | A01K 89/01082 |

FOREIGN PATENT DOCUMENTS

| | | |
|---|---|---|
| JP | 2003-235415 A | 8/2003 |
| JP | 2004-187645 A | 7/2004 |

* cited by examiner

*Primary Examiner* — Emmanuel M Marcelo
(74) *Attorney, Agent, or Firm* — United IP Counselors, LLC

(57) ABSTRACT

A line guide apparatus of a fishing reel includes a line guide unit having a bore extending longitudinally therethrough, and a sleeve provided within the bore configured to receive a fishing line. The line guide unit has an inner surface defining a wall of the bore that is formed with one or more protruding ribs configured to retain the sleeve in a position inside the line guide unit.

5 Claims, 3 Drawing Sheets

LINE GUIDE APPARATUS OF FISHING REEL

CROSS-REFERENCE TO RELATED APPLICATIONS

This application claims priority to Malaysian Patent Application No. PI2020004458, filed Aug. 28, 2020. The contents of that application are incorporated by reference herein in their entirety.

TECHNICAL FIELD

This invention relates to a line guide apparatus of a fishing reel, particularly for use in a baitcasting reel.

BACKGROUND ART

A fishing line is wound around a spool of a fishing reel that allows winding and unwinding action of the fishing line. However, continuous performance of such action can result in the fishing line to be entangled or damaged. A solution to this issue is to have a line guide apparatus to guide the fishing line as the spool rotates. The line guide apparatus is attached to a level winder that controls winding of the spool through a coupling unit of the line guide apparatus. A line guide unit of the line guide apparatus, on the other hand, serves to allow the fishing line to pass through and wind around the spool. The line guide apparatus regulates spooling of the fishing line to ensure even winding of the fishing line in order to achieve smooth movement of the fishing line into and from the water during casting and retrieving of the fishing line.

One of the common problems with the line guide apparatus lies on the line guide unit where the sleeve within the line guide unit is prone to detach and come off from the line guide unit. The line guide unit has a bore extending longitudinally therethrough with the sleeve being attached within the line guide unit. The sleeve functions as a reinforcing component for the line guide unit as it is vital for the line guide unit to be robust to prevent breakage caused by the fishing line, especially when there is a huge force exerted to the line guide unit by the fishing line during the process of fishing.

Partial or full dislocation of the sleeve before or after use of the line guide apparatus is caused by weak attachment of the sleeve to the inner surface of the line guide unit that defines a wall of the bore. Typically, the sleeve is adhered to the wall by adhesives like glue. However, exposure to water weakens performance of the adhesive, especially salt water which the fishing reel is usually exposed to during fishing activity. Bonding of the sleeve to the line guide unit is affected and therefore the sleeve is prone to detach from the line guide unit. Other attaching methods such as to have certain structures inside the line guide unit to hold the sleeve in position after inserting the sleeve into the line guide unit is difficult and not feasible to be performed as it could break the sleeve easily. Further, manufacturing of such structure within the line guide unit is complicated and costly.

BRIEF SUMMARY

An object of the present invention is to provide a line guide apparatus of a fishing reel with a line guide unit having a sleeve retained securely therewithin without being dislocated and coming off from the line guide unit. Such sleeve reinforces structural integrity of the line guide unit such that it is capable of sustaining force exerted by the fishing line and prevent breakage or damages caused by the fishing line. Therefore, it is vital to keep the sleeve in position within the line guide unit. Another object of the present invention is to provide a line guide apparatus that is capable of retaining the sleeve through its structure. Protruding ribs are formed within the line guide unit to hold the sleeve in position without being detached from the line guide unit. Further another object of the present invention is to provide an efficient method to prevent the sleeve from detaching from the line guide unit. In particular, such method does not affect attachment of the sleeve to the line guide unit even when it is exposed to water. In addition, the present invention aims to provide an easy to manufacture structure for the line guide apparatus, such that the protruding ribs can be formed to clamp the sleeve in position in a process that can be controlled easily and carried out safely without damaging any components of the line guide apparatus. Durability of the line guide apparatus with a securely retained sleeve can be ensured with the present invention that can be manufactured through an uncomplicated and uncostly method. Strong attachment of the sleeve to the line guide unit that allows permanent holding of the sleeve is attainable by the present invention which is suitable to be applied on baitcasting reel that requires durable, robust and high strength structure to sustain heavier set-ups or fish and overcome obstacles caused by water exposure.

At least one of the preceding objects is met, in whole or in part, by the present invention, in which the present invention provides a line guide apparatus of a fishing reel which includes a line guide unit having a bore extending longitudinally therethrough; and a sleeve provided within the bore for receiving a fishing line; wherein the line guide unit has an inner surface defining a wall of the bore that is formed with one or more protruding ribs for retaining the sleeve in position inside the line guide unit.

In one of the aspects of the invention, the ribs are formed at positions adjacent to both end parts of the sleeve so as to clamp the sleeve.

According to another aspect of the invention, each rib is in the form of a protrusion that extends radially from the wall of the bore and tapers inwards from each end portion of the wall to reach the end part of the sleeve.

Preferably, the end portion of the wall of the bore and the end part of the sleeve has a distance of 0.3 mm to 0.8 mm therebetween.

It is preferred that line guide unit is made of plastic and the sleeve is made of ceramic.

BRIEF DESCRIPTION OF THE DRAWINGS

This invention will now be described in greater detail with reference to the accompanying drawings.

DETAILED DESCRIPTION

For a better understanding of the invention, preferred embodiments of the invention that are illustrated in the accompanying drawings will be described in detail.

Figure 5:
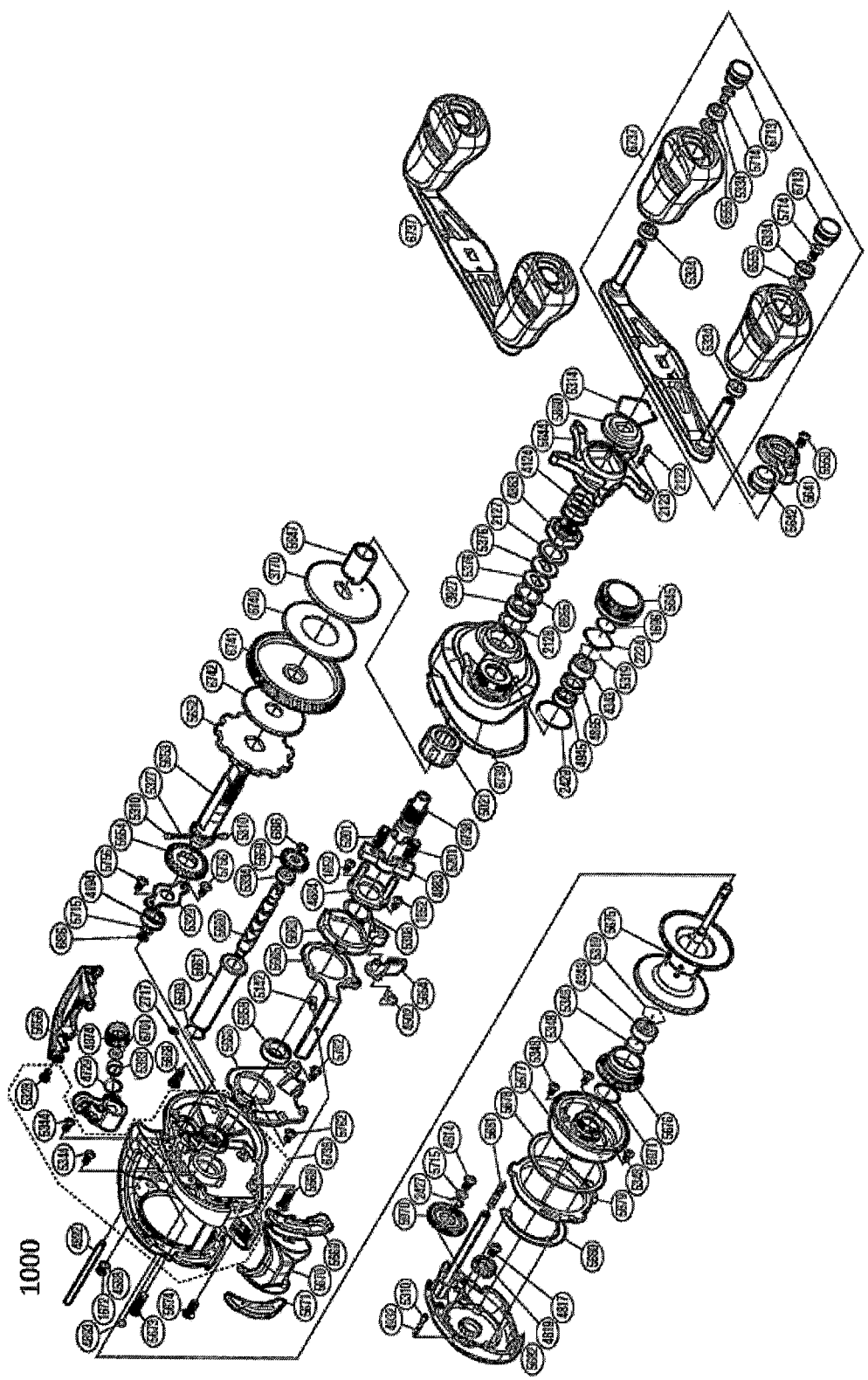
FIG. 5 is an exploded view of a baitcasting reel showing positioning of the line guide apparatus with respect to the fishing reel frame assembly and the level winder.

Disclosed herein is a line guide apparatus 1000 of a fishing reel used for guiding a fishing line. Referring to FIG. 5, the fishing reel, which is preferably a baitcasting reel, is equipped with a spool 5675 for winding and unwinding the fishing line that is held and stored thereon. A level winder, where the line guide apparatus 1000 is coupled to, is provided for winding the fishing line on the spool 5675. The line guide apparatus 1000 serves to prevent tangling of the fishing line to enable uniform winding and unwinding of the fishing line.

Figure 1:
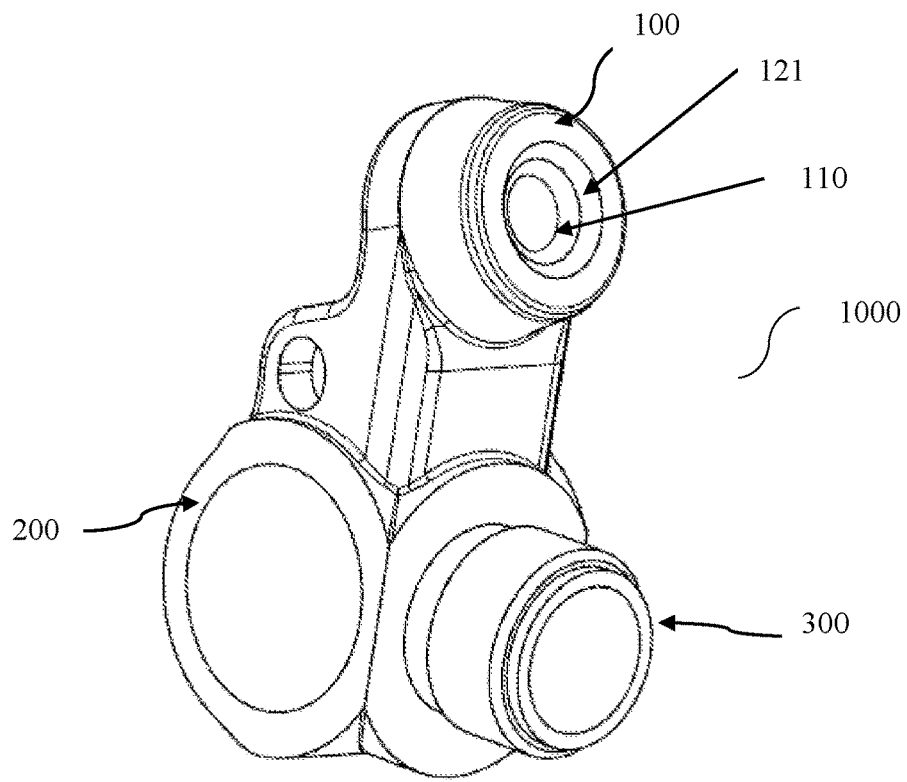
FIG. 1 is a first perspective view of the line guide apparatus showing bores of the line guide unit, coupling unit and pawl holder unit.
Figure 2:
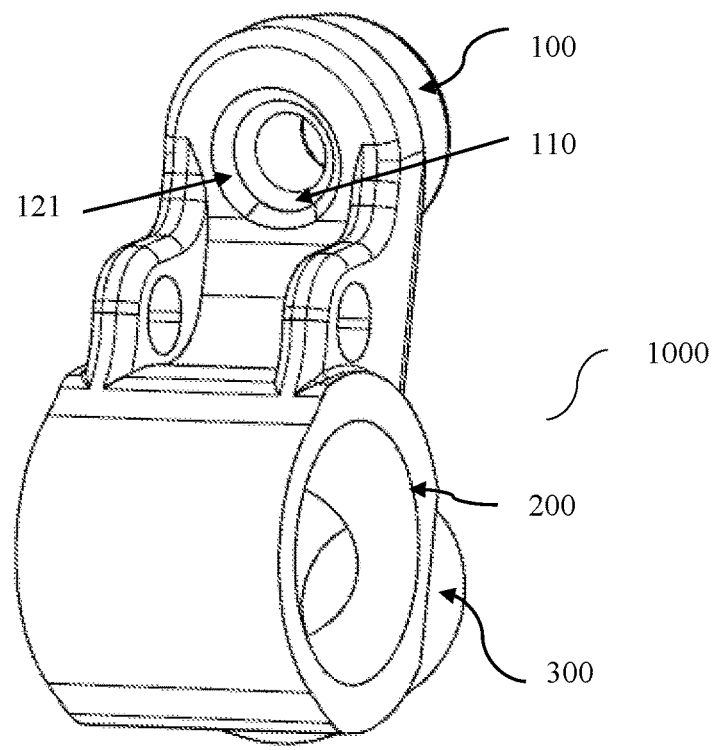
FIG. 2 is a second perspective view of the line guide apparatus that is an opposite view to the first perspective view.

Referring to FIG. 1 and FIG. 2, the line guide apparatus 1000 includes three main units, being the line guide unit 100, coupling unit 200 and pawl holder unit 300. In a preferred embodiment of the present invention shown in FIG. 1 and FIG. 2, all three main units are integrally formed in a piece. It Is however understood that the three main units can be separate pieces and assembled together to form the line guide apparatus 1000. Each unit are preferably in tubular form where a bore is formed therethrough. The line guide unit 100 is preferably above the coupling unit 200 and pawl holder unit 300 for the fishing line to pass therethrough. On the other hand, the coupling unit 200 is employed to fasten the line guide apparatus 1000 to the level winder where a shaft of the level winder being the level wind guard 5661 as shown in FIG. 5 is inserted through the bore of the coupling unit 200. Facilitating as an accommodation for a pawl 5383, the pawl holder unit 300 allows the pawl 5383 to sit therein for interacting with a worm shaft 5660 at the level winder to guide the fishing line from the spool 5675 smoothly.

Figure 3:
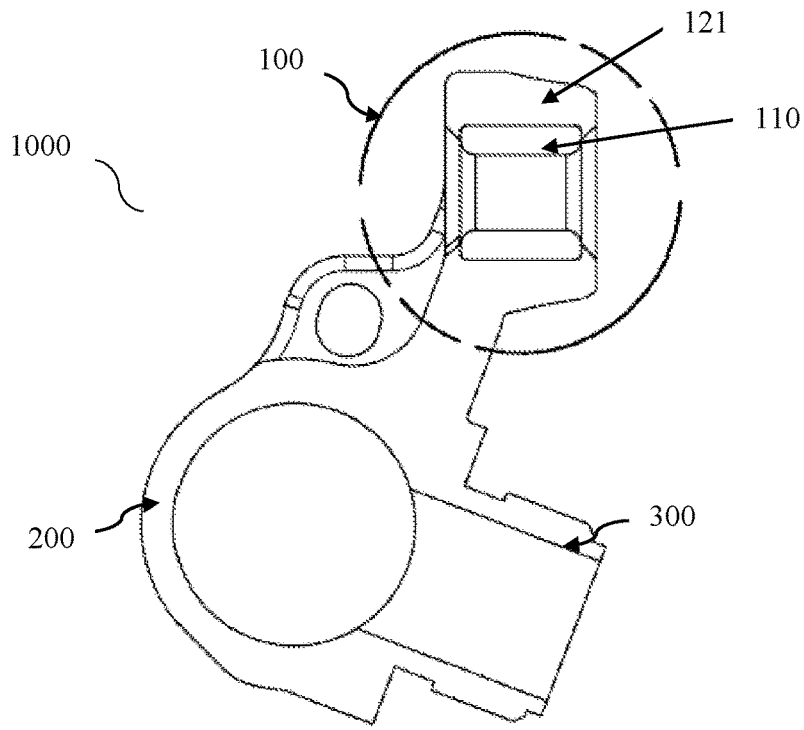
FIG. 3 is a side cross-sectional view of the line guide apparatus.

As shown in FIG. 3, The present invention focuses on the line guide unit 100 where a sleeve 110 is inserted within the bore of the line guide unit 100 that extends longitudinally therethrough. The sleeve 110 is used for reinforcing the line guide unit 100 to prevent the line guide unit 100 from being damaged by the fishing line. The line guide unit 100 has an inner surface defining a wall 120 of the bore that surrounds the sleeve 110. Preferably made of reinforcing material such as ceramic, the sleeve 110 is retained in position within the line guide unit 100 by one or more protruding ribs 121 extending from the wall 120 of the bore to be in contact with the sleeve 110 such that the sleeve 110 has no or limited movement within the bore of the line guide unit 100.

Figure 4:
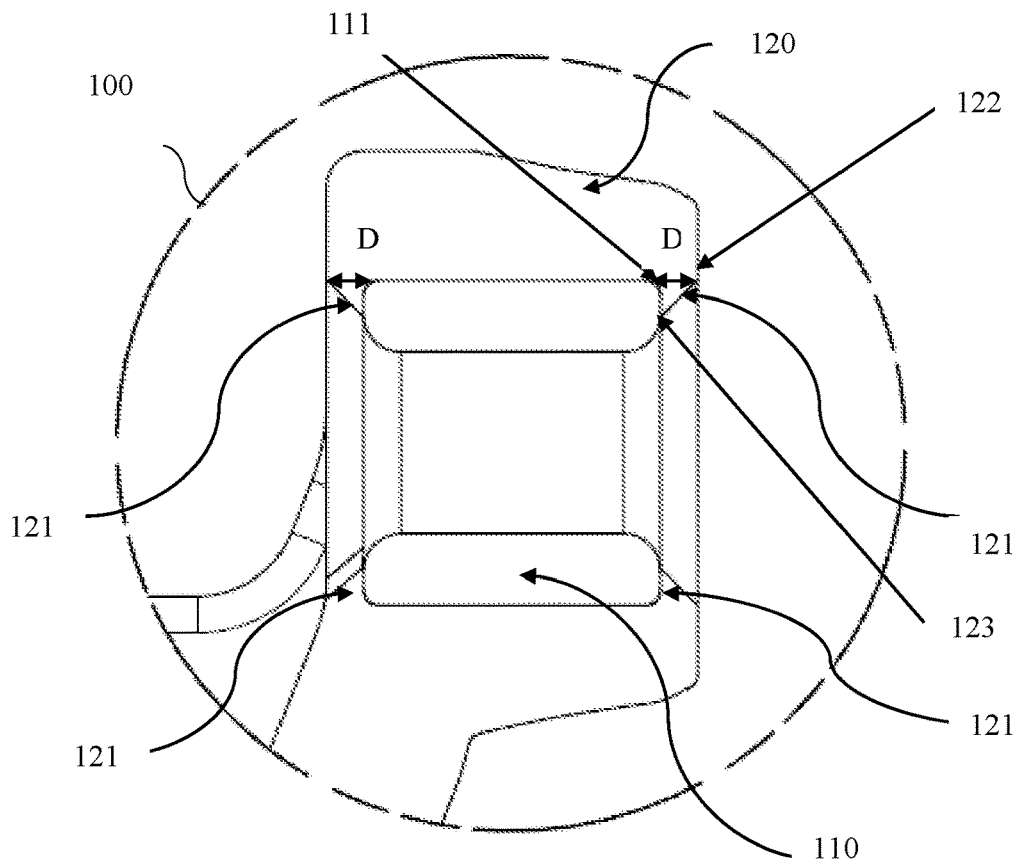
FIG. 4 is a side cross sectional view of the line guide unit whereby the sleeve is retained within the line guide unit by the protruding ribs.

In a preferred embodiment of the present invention illustrated in FIG. 4, the line guide unit 100 is provided with two ribs 121 at positions adjacent to both end parts 111 of the sleeve 110 so as to clamp the sleeve 110. A first rib is located at a first end part of the sleeve 110, whereas a second rib is located at a second end part of the sleeve 110. Each rib 121 is in the form of a protrusion that extends radially from the wall of the bore and tapers inwards from each end portion of the wall 120 to reach the end part 111 of the sleeve 110. The external end 122 of the rib 121 which is also the end portion of the wall 120 has a diameter larger than the internal end 123 of the rib 121, whereas the internal end 123 of the rib 121 has a diameter smaller than the end part 111 of the sleeve 110 for restricting movement of the sleeve 110 to keep the sleeve 110 within the space guarded by both ribs 121. It should be noted with the dimension of the internal end 123 of the rib 121 being smaller than the end part 111 of the sleeve 110 or sufficient to block the sleeve 110 from leaving the line guide unit 100, the sleeve 110 can be retained within the line guide unit 100.

The end portion of the wall 120 of the bore and the end part 111 of the sleeve 100 that defines thickness of the rib 121 which spans from the external end 122 of the rib 121 to the internal end 123 of the rib 121 has a distance 'D' as denoted in FIG. 4 of 0.3 mm to 0.8 mm therebetween, with 0.5 mm being the most preferred distance. Such thickness of the rib 121 has sufficient strength to hold the sleeve 110 in position.

Since the line guide apparatus 1000 including the ribs 121 is preferred to be made of plastic that has brittle characteristic, the rib 121 that is not intended to be overly thick needs to however be strong enough when it is subjected to stress.

To manufacture the line guide apparatus 1000, in particular the line guide unit 100 with ribs 121 to hold the sleeve 111 in position within the line guide unit 100, the present invention utilizes the insert molding technique. A molding tool catered for fabricating the present invention are formed with a structure which corresponds to the shape of the line guide unit 100. The molding tool is configured to provide at least one molding cavity for receiving a molding material such as plastic to form a full or partial line guide unit 100 including one or more ribs 121 protruding from the inner surface of the line guide unit 100 for holding the sleeve 110 in position within the line guide unit 100.

The sleeve 110 functions as a pre-placed insert within the molding cavity for the insert molding process to be performed. By filing the molding cavity with the molding material, the line guide unit 100 with the ribs 121 in the desired structure and dimensions as described above for holding the sleeve 110 can be formed. The sleeve 110 is already inserted within the line guide unit 100 during production phase and need not be inserted into the line guide unit 100 after the line guide unit 100 is manufactured. With the use of other molding tools, the entire line guide apparatus 1000 can be formed. However, the ribs 121 can be formed by welding or hot melt instead of molding.

An exploded view of the baitcasting reel is shown in FIG. 5, showing position of the line guard apparatus 1000 that is intended to be coupled with the level winder with the level wind guard 5661 being inserted through the coupling unit 200, whereby the level winder is inserted through the frame assembly 6736 of the reel. Table 1 below lists the components of the baitcasting reel shown in FIG. 5.

| No. | Component | No. | Component |
| --- | --- | --- | --- |
| 0686 | E Lock | 4502 | Clutch Pawl Spring |
| 1652 | Screw | 4588 | Washer |
| 1672 | E Lock | 4729 | O Ring |
| 1696 | Cast Control Spacer (B) | 4814 | Screw |
| 2122 | Click Pin | 4817 | Screw |
| 2123 | Click Spring | 4819 | Idle Gear |
| 2127 | Star Drag Spacer | 4863 | Star Drag Nut |
| 2128 | Washer | 4865 | Bearing Spacer |
| 2224 | Spool Tension Spacer (A) | 4874 | Pawl Cap |
| 2427 | O Ring | 4883 | Yoke |
| 2429 | O Ring | 4884 | Clutch Cam Retainer |
| 2717 | E Lock | 4892 | Stabilizer Bar |
| 3770 | Key Washer | 4893 | Washer |
| 3927 | Ball Bearing | 4932 | Click Spring |
| 4124 | Star Drag Spring | 4945 | Ball Bearing |
| 4194 | Ball Bearing | 5021 | Roller Clutch Bearing |
| 4343 | Ball Bearing | 5142 | Screw |
| 5201 | Yoke Spring | 5663 | Clutch Cam |
| 5308 | Washer | 5664 | Clutch Pawl Assembly |

-continued

| No. | Component | No. | Component |
| --- | --- | --- | --- |
| 5310 | Idle Gear Pin | 5665 | Clutch Plate |
| 5314 | Click Plate Retainer | 5666 | Clutch Guard |
| 5319 | Bearing Retainer | 5668 | Screw |
| 5327 | Idle Gear Spring | 5669 | Clutch Bar Guide |
| 5328 | Screw | 5670 | Clutch Button Assembly |
| 5329 | Drive Shaft Retainer | 5671 | Clutch Bar Guide |
| 5334 | Bushing | 5673 | Screw |
| 5344 | Screw | 5674 | Screw |
| 5346 | Spacer B | 5675 | Spool |
| 5348 | Screw | 5676 | Brake Ring Gear Assembly |
| 5376 | Drag Spring Washer | 5677 | Brake Case Assembly |
| 5383 | Pawl | 5678 | Washer |
| 5503 | O Ring | 5679 | Left Side Plate Cam Lever |
| 5558 | Screw | 5680 | Washer |
| 5641 | Handle Nut Plate | 5681 | Spring |
| 5642 | Handle Nut | 5682 | Left Side Plate Assembly |
| 5644 | Star Drag | 5714 | Screw |
| 5645 | Cast Control Cap | 5715 | Drive Shaft Washer |
| 5647 | Roller Clutch Inner Tube | 5756 | Screw |
| 5652 | Anti-reverse Ratchet | 5762 | Screw |
| 5653 | Drive Shaft | 5858 | Ball Bearing |
| 5654 | Idle Gear | 5860 | Star Drag Click Plate |
| 5656 | Level Wind Protector | 5970 | Brake Dial |
| 5657 | Line Guide Assembly | 5971 | O Ring |
| 5659 | Idle Gear | 6555 | Washer |
| 5660 | Worm Shaft | 6655 | Washer |
| 5661 | Level Wind Guard | 6701 | Spacer |
| 6713 | Handle Knob Seal | 6740 | Drag Washer |
| 6736 | Frame Assembly | 6741 | Drive Gear |
| 6737 | Handle Assembly | 6742 | Drag Washer |
| 6738 | Pinion Gear | 4692 | B-100 Oil |
| 6739 | Right Side Plate | | |

Although the description above contains many specifications, it is understood that the embodiments of the preferred form are not to be regarded as a departure from the invention and it may be modified within the scope of the appended claims.

What is claimed is:

1. A line guide apparatus of a fishing reel, comprising:
a line guide unit having a bore extending longitudinally therethrough; and
a sleeve provided within the bore configured to receive a fishing line,
wherein the line guide unit has an inner surface defining a wall of the bore that is formed with one or more protruding ribs configured to retain the sleeve in a position inside the line guide unit, and
the ribs are formed at positions adjacent to both end parts of the sleeve so as to clamp the sleeve.

2. The line guide apparatus according to claim 1, wherein each rib is a protrusion that extends radially from the wall of the bore and tapers inwards from each end portion of the wall to reach the end part of the sleeve.

3. The line guide apparatus according to claim 2, wherein the end portion of the wall of the bore and the end part of the sleeve has a distance of 0.3 mm to 0.8 mm therebetween.

4. The line guide apparatus according to claim 1, wherein the line guide unit is made of plastic.

5. The line guide apparatus according to claim 1, wherein the sleeve is made of ceramic.

* * * * *

UNITED STATES PATENT AND TRADEMARK OFFICE
CERTIFICATE OF CORRECTION

| | |
|---|---|
| PATENT NO. | : 11,910,789 B2 |
| APPLICATION NO. | : 17/412470 |
| DATED | : February 27, 2024 |
| INVENTOR(S) | : Muhammad Aliff Nazreen Bin Norazmi et al. |

It is certified that error appears in the above-identified patent and that said Letters Patent is hereby corrected as shown below:

On the Title Page

The following section is added:
(30) Foreign Application Priority Data
August 28, 2020 (MY).................................PI2020004458

Signed and Sealed this
Ninth Day of April, 2024

Katherine Kelly Vidal
*Director of the United States Patent and Trademark Office*